Nov. 16, 1971     J. E. FEUCHT     3,620,133
HEAT DISSIPATING BEARING WITH WEAR COMPENSATING MEANS
Filed Jan. 9, 1970     3 Sheets-Sheet 1
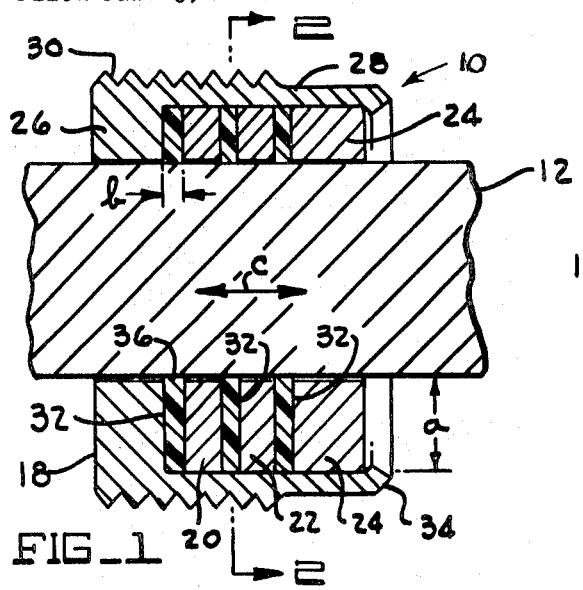
FIG_1
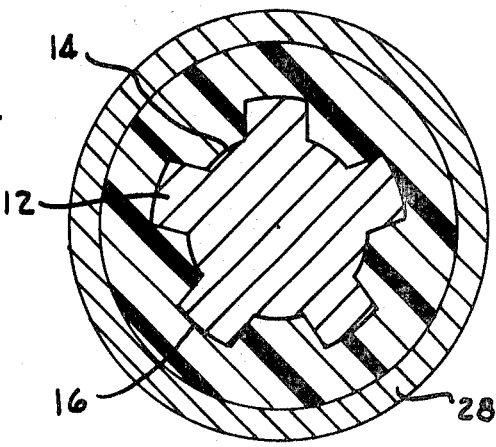
FIG_2
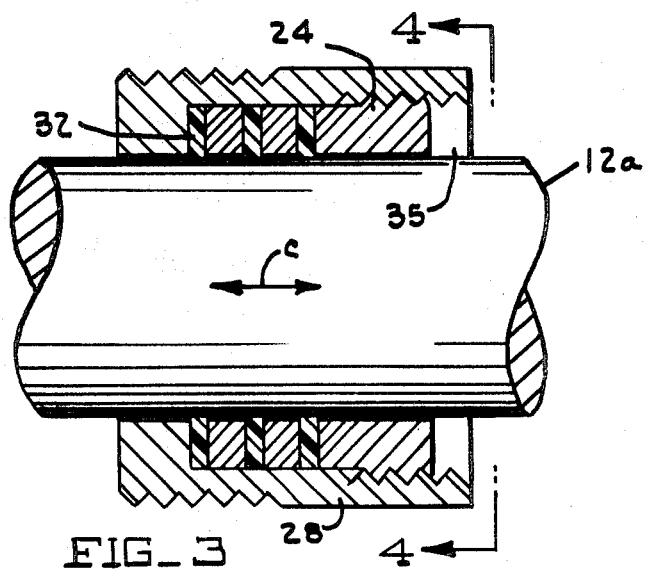
FIG_3
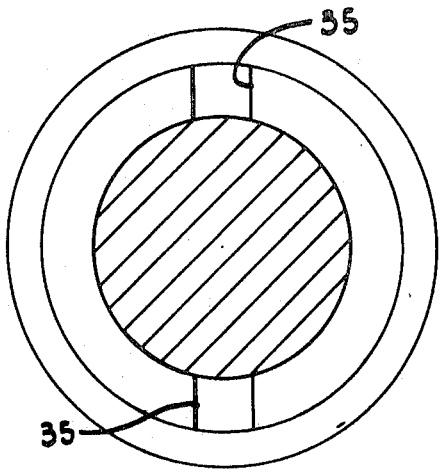
FIG_4
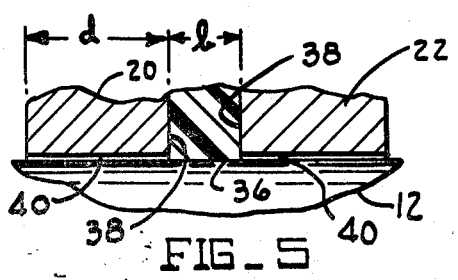
FIG_5
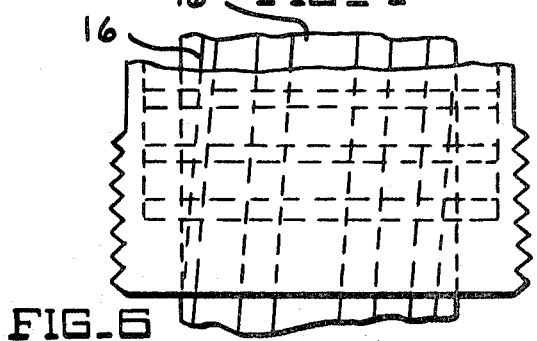
FIG_6
INVENTOR.
JACOB E. FEUCHT

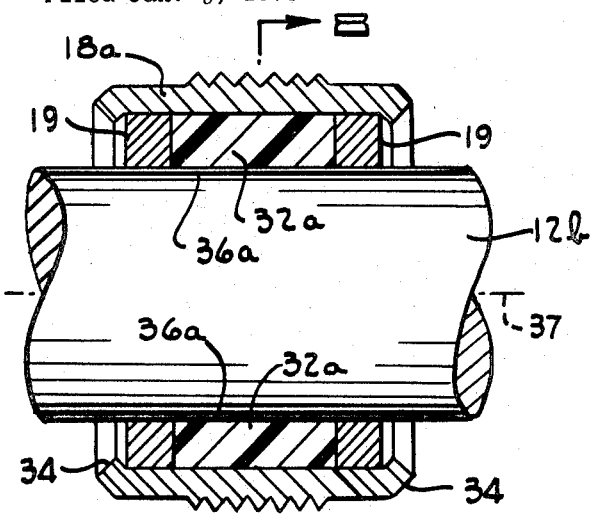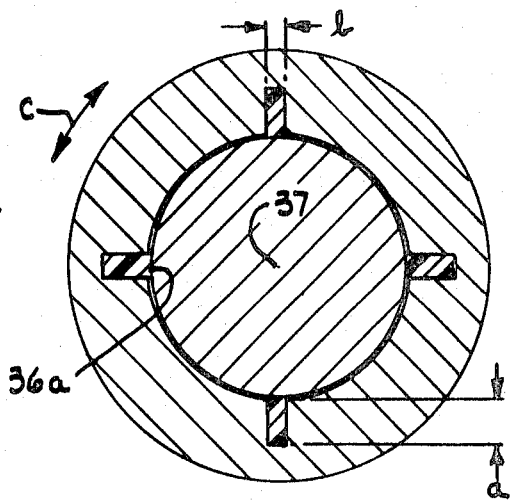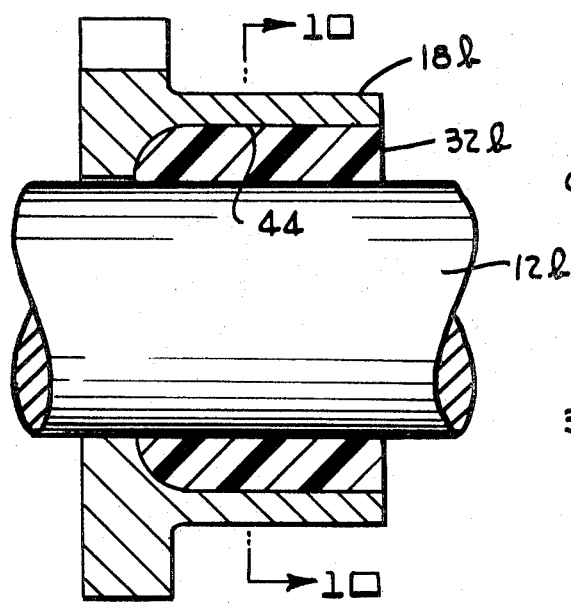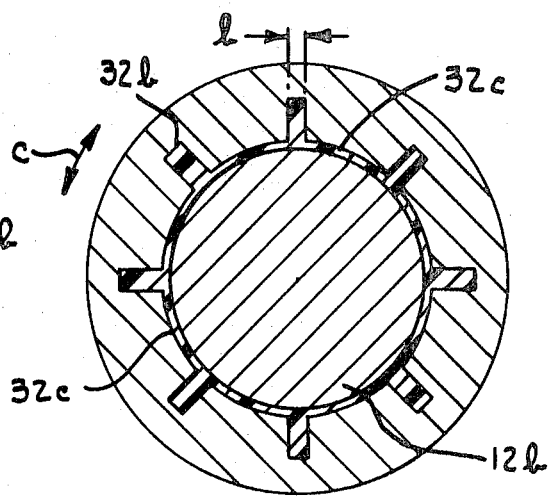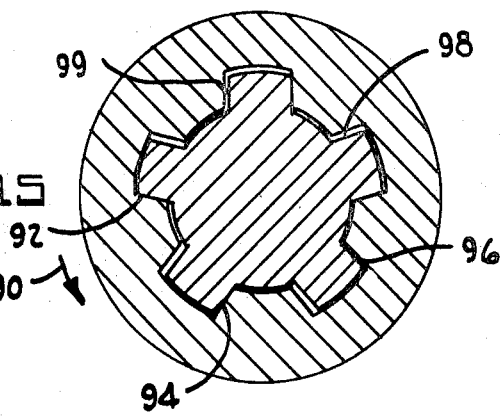

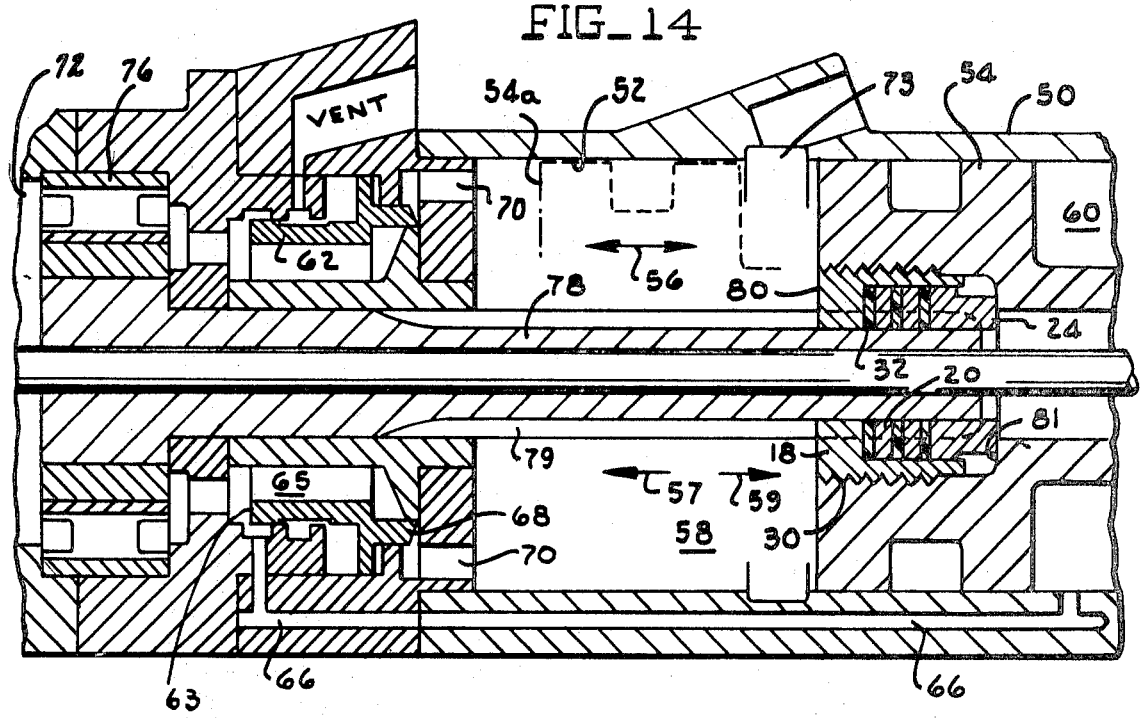
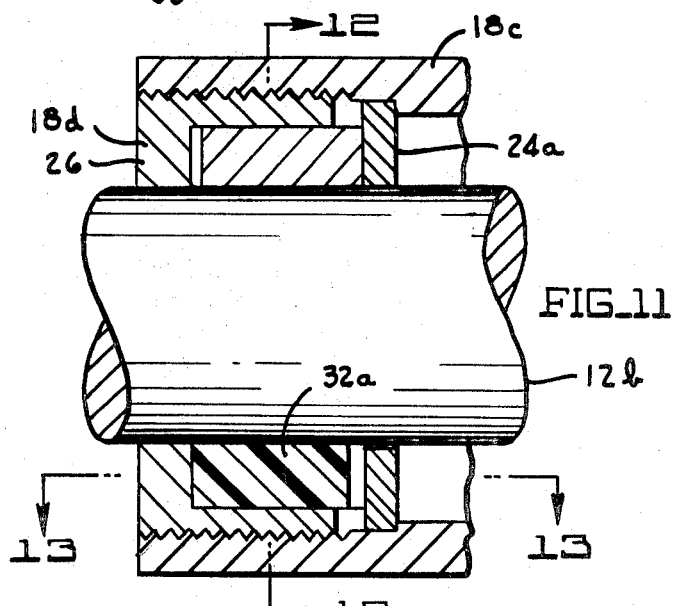
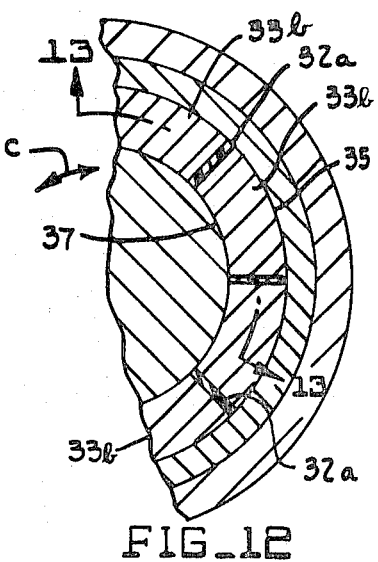
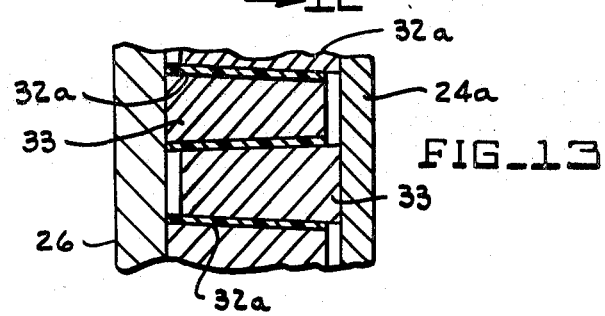

United States Patent Office  3,620,133
Patented Nov. 16, 1971

3,620,133
HEAT DISSIPATING BEARING WITH WEAR COMPENSATING MEANS
Jacob E. Feucht, Sidney, Ohio, assignor to Westinghouse Air Brake Company, Pittsburgh, Pa.
Filed Jan. 9, 1970, Ser. No. 1,608
Int. Cl. F01b 3/06; F16c 31/00, 37/00
U.S. Cl. 92—33                          1 Claim

ABSTRACT OF THE DISCLOSURE

A bushing type shaft bearing for use in the piston of a percussion drill comprising spaced plastic bearing elements disposed in slots in a metallic heat conductive retainer. The retainer dissipates frictional heat developed in the plastic, and also reinforces the plastic against warpage, deformation or cold flow out of the slots. The retainer being threaded into the piston so that an endmost element forcibly abuts against a piston surface to apply an axial squeezing force on the trapped elements.

SUMMARY

This invention pertains to a bushing for a shaft which moves axially and/or rotationally relative to the bushing. Especially the invention contemplates an improved bushing for use in the piston of a percussion drill such that the piston can have a helical motion as it moves axially in one direction and a simple axial motion as it moves in the other direction; the bushing engages a shaft that can rotate in one direction but not in the other, such that the shaft turns the piston on one stroke and the piston turns the shaft on the other stroke. The invention has for its principal object the provision of a long-like bushing having the ability to dissipate frictional heat developed during back-and-forth movement of the piston.

THE DRAWINGS

FIGS. 1, 3, 7, 9 and 11 are longituditional sectional views taken through bearing structures embodying the invention.

FIGS. 2, 4, 8, 10 and 12 are transverse sectional views taken through the embodiments of FIGS. 1, 3, 7, 9 and 11 respectively.

FIG. 5 is an enlarged fragmentary sectional view through a portion of the FIG. 1 bearing.

FIG. 6 is a plan view of the FIG. 1 bearing.

FIG. 13 is a fragmentary sectional view on line 13—13 in FIG. 12.

FIG. 14 is a longitudinal sectional view through a percussion drill embodying the invention.

FIG. 15 illustrates the operation of a conventional bearing.

FIG. 1 EMBODIMENT

FIG. 1 shows a bushing 10 for slidably guiding a thorugh shaft 12 in the arrow $c$ direction. The bearing is preferably formed by plastic and bronze strips, while the shaft is preferably formed of steel. As shown in FIG. 2, the shaft may be of noncircular cross section comprising a circular central section 14 and five flute-forming lands 16. The bushing 10 consists generally of an annular structure having an opening or passageway therethrough conforming to the outline of the shaft 12 so that the shaft and bushing are keyed on one another. Lands 16 may have a slight helical pitch as shown in FIG. 6 so that relative axial movement between the bushing and shaft will produce helical or spiral shaft motion, i.e. a combined axial and rotational movement.

The bushing shown in FIG. 1 comprises a metallic heat-conductive retainer structure consisting of a cup-shaped cage 18 and three metallic disks 20, 22 and 24. The cage includes an annular end wall 26 and a peripheral side wall 28 having threads 30 on its outer surface for attachment of the bushing to a fixed or movable supporting wall (not shown). The spaces between end wall 26 and the various disks 20, 22 and 24 constitute slots for reception of rigid plastic bearing elements or disks 32.

Disks 32 are preferably formed of suitable plastic bearing material such as adipamide polymer trademarked under the name "nylon" or tetrafluoroethylene polymer trademarked under the name "Teflon." These materials can be impregnated with a dry lubricant such as graphite or molybdenum sulphide.

In forming the bushing construction the various disks 20, 22, 24 and 32 may be dropped into the cavity provided within the cage 18. Thereafter the peripheral side wall of the cage may be spun or staked over the end most disk 24, as as 34, to retain and hold the disks within the cage. The central openings in the various disks and cage end wall 26 correspond in shape with the outline of shaft 12, but the various disks may be rotationally displaced from one another to form the aforementioned helical passageway. Thus, the disks may be assembled into the cage around a central helical mandrel of the same shape as shaft 12. The staking or spinning operation can be performed while the disks are located on the mandrel, to thereby locate the disks in the offset rotational position for defining the aforementioned helical passageway.

HEAT DISSIPATION

Prior to this invention there have been several proposals for utiliznig plastic bearing materials in combination with metallic substances for removing frictional heat developed within the plastic. For example, U.S. Pat. 3,072,449 to Moreley et al. shows a plastic bushing having a metallic heat-conductive coil embedded therein to conduct heat from the bearing surface defined by the inner face of the plastic bushing.

The present invention, as embodied in FIG. 1, utilizes the plastic bearing elements as thin strips or disks having widths or thicknesses $b$ that are substantially less than the radial depths or dimensions $a$ of the confining slots formed between the metallic disks or walls 20, 22, 24 and 26. The slot side surfaces formed by these confining metallic walls have extensive surface area contact with the side surfaces of the plastic disks 32 so that frictional heat developed in the bearing elements 32 is readily absorbed into the metallic elements. Preferably the dimension $b$ is on the order of one-sixteenth inch so that a relatively short thermal path exists between each disk bearing surface 36 and the adjacent metal surface 38 (see FIG. 5).

The disks 20, 22 and 24 preferably have widths or thicknesses that are substantially greater than the widths of the disks 32 so that the metallic elements offer little or no thermal resistance. Also, the disks 20, 22 and 24 preferably have a relatively close engagement with the inner surface of cage side wall 28 so that heat absorbed by the disks is readily conducted into the cage 18 and the support structure in which it is mounted.

Previous to this invention applicant utilized a bushing formed essentially of pure plastic. It was found that the plastic deformed and wore quite badly, due partly it is believed to the inability of the plastic to dissipate frictional heat developed at its points of contact with the shaft. Tests on the FIG. 1 device indicate that the FIG. 1 bushing has a life expectancy many times that of the pure plastic bushing. It is believed that the increase in life is due in part to the heat-dissipating abilities of the metallic portions of the bushing structure.

PLASTIC DEFORMATION

Various workers in the field have recognized that plastic bearing materials are subject to warpage, shrinkage or deformation due to mechanical or thermal stress on the plastic material. For example U.S. Pat. 2,989,355 to Terhorst has proposed a bearing wherein an annular plastic bushing is encased within a metallic sleeve, the plastic bushing having button-like areas thereof projecting through openings in the metallic sheath to firmly lock the plastic onto the sheath and restrain same against deformation, such as warping or shrinking.

The present invention, as embodied in FIG. 1, utilizes the spaced disks or walls 20, 22, 24 and 26 as rigid structures for trapping the plastic disks therebetween such that the disks completely fill the defined slots, whereby the plastic elements are unable to warp or move with respect to the confining metal walls.

The mechanical stress-absorbing action of the metallic walls is achieved using plastic disks 32 which are in themselves very thin and otherwise subject to warpage or deformation. The amount of plastic used is very small because of the thinness of the disks; hence the possible shrinkage is quite small. Additionally the large area of plastic-metal contact probably tends to minimize radial shrinkage.

FRICTION ACTION

Preferably the openings in the plastic disks and the openings in the metal disks are approximately the same shape and dimension so that both the plastic and metal members act as friction surfaces. If desired, the openings in the plastic elements can be slightly smaller than the openings in the metallic elements as shown in FIG. 5, in which case the plastic elements are the only friction surfaces.

Preferably the metallic elements 18, 20, 22 and 24 are formed of a bronze alloy, and the shaft 12 is formed of steel. The plastic elements 32 are preferably arranged in planes normal to the direction of movement of the shaft so that the metal elements 26, 20, 22 and 24 tend to absorb the mechanical stress imposed on the thin plastic bearing elements. There may be some slight cold flow of the plastic material into the joints 40 (FIG. 5) between the metallic elements and the shaft surface, depending on the clearance between the shaft and the metal elements. The clearance is preferably kept as small as possible to minimize such cold flow. Apparently the cycling of the shaft produces such limited cold flow of the plastic as will enable the plastic to polish the shaft and produce a high density, low friction surface on the plastic, this surface being effective to carry the loadings imposed by the shaft and to prevent the bronze from wearing away.

Previous to this invention it was common to form bushings from bronze alone; i.e. as a one piece cast structure having no plastic disks therein. The service life of such all-bronze structures was appreciably less than the expected life of the FIG. 1 plastic-bronze assembly. It is believed that the increased life is partly attributable to the polishing action of the steel shaft on the plastic and vice versa, such polishing action in turn being attributable to the reinforcement of the plastic by the bronze walls. Thus, it is believed that bronze reinforcing walls effectively contain the plastic so that shaft loadings densify the plastic without permitting it to appreciably escape out of the slots. The densified plastic surface serves as a long wearing, low friction guide surface for the shaft.

FIG. 3

It is believed that the invention can be utilized in devices other than the FIG. 1 device. FIG. 3 illustrates a construction which is believed feasible. As there shown, the bushing is designed to accommodate axial movement of a cylindrical shaft 12a in the arrow c direction. In this form of the invention the various plastic disks and metallic disks have circular openings therethrough conforming to the circular outline of the shaft 12a. For illustration purposes FIG. 3 shows the endmost disk 24 as having a thread connection with the cage wall 28. A screw driver slot 35 may be provided in the end face of disk 24 to force that disk against the other disks and produce a clamping action thereon during fabrication of the bushing.

The general action and theory of operation of the FIG. 3 device is similar to that of FIG. 1, the only difference being that in FIG. 1 the shaft has a helical motion while in FIG. 3 the shaft has a straight line axial motion.

FIG. 7

FIG. 7 illustrates a bushing designed for rotational support of a shaft 12b. This bushing comprises a metallic heat conductive retainer formed by a cage 18a and spaced end plates 19. Arranged between plates 19 are four rigid plastic bearing elements or blocks 32a, the inner surfaces 36a thereof constituting the primary friction surfaces for engagement with the shaft as it rotates around its axis 37.

The bearing elements 32a are retained in axial slots milled through cage 18a. After placement of the bearing elements within these slots the end wall structures 19 are placed within the cage 18a, and the end edges of the cage staked over the wall structures, as at 34, to lock the bearing elements within the cage.

It is believed that the FIG. 7 device would operate with desirable characteristics of low friction, rapid heat dissipation, and mechanical stability in a manner similar to the FIG. 1 device. It will be noted that in the FIG. 7 construction the plastic elements 32a have their widths b arranged normal to the direction of movement of the shaft so that the side surfaces of the slots in the cage absorb mechanical stresses placed on the plastic bearing elements.

FIG. 9 DEVICE

FIG. 9 illustrates an embodiment of the invention wherein the plastic bearing elements are incorporated into the metallic retainer 18b by casting or molding. The metallic retainer 18b is used as a mold insert or mold cavity.

Metallic retainer 18b is formed with a number of slots 44, as for example by milling operations. The retainer is then utilized as a mold cavity in cooperation with a cylindrical mold cavity member corresponding in shape and size to the shaft 12b. Pressure injection of the plastic melt or other similar procedures can be used to cast the bearing strips 32b as inserts in retainer 18b. If desired, the bearing surface can be augmented or increased by forming the molding with integral plastic ring sections 32c, said ring sections cooperatively forming a complete circular bearing surface for frictional engagement with the shaft 12b. Preferably the ring sections 32c are relatively thin in the radial direction, as for example .005 inch. Such thin sections are believed to provide heat dissipation into the surrounding metallic cage material. Additionally thin sections are believed better able to withstand uneven radial loadings since there is less plastic material to cold flow or deform. The plastic sections 32c anchor the plastic molding against circumferential dislodgement.

The various plastic bearing elements 32b have their widths b arranged normal to the direction of movement of the shaft so that the side surfaces of the confining slots in the metallic cage structure absorb circumferential mechanical stress placed on the bearing elements. As in the other embodiments of the invention, the plastic bearing elements 32b completely fill the slots so that metallic retainer surfaces are in direct contact with the plastic surfaces, thereby absorbing the frictional heat developed in the bearing elements.

The various drawings show the bearings in direct frictional engagement with solid shaft structures. Such shafts can of course be hollow or in the form of inner raceways attached to other shaft or rod devices. This invention relates to the construction of the so-called outer raceway or friction surface, and the invention can be practiced with inner raceways of various types.

FIG. 11

Previous discussion indicates the desirability of employing plastic bearing elements of thin cross section measured in the direction of shaft movement. Such thin elements, when adequately reinforced by the metallic slot side walls, presumably have improved heat dissipation with little or no cold flow of the plastic material out of the confining slots. Nevertheless, some displacement of the plastic may in time take place, either because of cold flow, frictional wear, or thermal aging. FIG. 11 illustrates an arrangement which is similar to the FIG. 7 arrangement except that it provides for adjustment of the component parts to compensate for displacement of the plastic bearing elements. The arrangement comprises a shaft 12b arranged for rotary motion as designated by arrow c. The support bushing for the shaft comprises a tubular housing 18c having internal threads engaged with external threads on a cup-shaped metallic retainer 18d. Arranged within the cup structure are eight plastic bearing strips 32a and eight metallic spacer segments 33b.

As shown in FIG. 12, each spacer segment has a cylindrical outer face 35 and a cylindrical inner face 37, said faces conforming to the contours of the retainer and shaft surfaces. The segments thus adequately trap or confine the plastic strips 32a in the FIG. 12 planes.

FIG. 13 shows the side surfaces of the segments 36b to be slightly convergent so that each segment is tapered or wedge-shaped as viewed in FIG. 13. Alternate segments 36b are reversed end for end so that adjacent surfaces on adjacent segments are parallel with one another to define slots for reception of the plastic bearing elements 32a.

During service the shaft 12b rotational load is borne by the edges of plastic bearing elements 32a and/or surfaces 37 of the spacer segments. Should the plastic elements shrink or otherwise change dimension it is possible to manually thread the retainer 18d inwardly to decrease the spacing between end wall 26 and thrust plate 24a. This action causes the segments 33 to move axially so that the tapered side surfaces of the segments move toward one another for exerting compressive actions on the interposed plastic bearing elements 32a. In this manner it is possible to compensate for wear or other displacement of the plastic as might possibly occur after a period of service.

FIG. 14

FIG. 14 illustrates the invention applied to a percussion drill of the type shown for example in U.S. Pat. 2,737,818. As shown in FIG. 14, the drill comprises a housing 50 which defines a cylinder 52 arranged to slidably accommodate a piston 54. Piston motion in the arrow 56 directions is accomplished by alternate admission of pressure fluid (for example compressed air) into the cylinder chambers 58 and 60 on opposite sides of the piston.

Valving for controlling the pressure fluid can take various conventional forms, but as schematically shown in FIG. 14 the valving can include a shuttle valve 62 having one of its ends 63 arranged to control flow of pressure fluid from space 65 into passage 66 leading to chamber 60; the other end 68 of the valve controls flow of pressure fluid from space 65 into passages 70 leading to chamber 58. Space 65 initially receives the pressure fluid from a chamber 72, via openings formed within a conventional one-way clutch 76 of the type shown for example in U.S. Pat. 2,737,818.

In its illustrated position valve 62 allows pressure fluid to flow from space 65 through passage 66 into chamber 60, thus driving piston 54 to the left. After the piston has moved approximately two inches, namely to the dotted line position 54a, the fluid in chamber 58 will have been compressed sufficiently to snap the valve 62 leftwardly for opening space 65 to the passages 70. In its new position valve 62 allows pressure fluid to be delivered into chamber 58, thereby moving piston 54 rightwardly back to its full line position; during this movement the passage 66 functions as an exhaust passage for chamber 60, as under conventional practice. Final stage of the piston's rightward movement is accompanied by exhaustion of pressure fluid from chamber 58 through the annular exhaust passage 73. The general mode of operation conventionally involves supply fluid pressures on the order of 90 p.s.i., piston cycle rates in excess of 30 cycles per second, and maximum piston velocities of about 30 feet per second.

In these conventional arrangements piston 54 acts as a hammer against a rock-fracturing tool (not shown). The piston is preferably guided and controlled so that it undergoes a slight rotational motion as it moves in the arrow 57 direction; this rotational movement allows the cutting element to present different cutting edges to the work during each successive stroke, thus improving the cutting operation. The rotational motion may also assist the piston in disengaging the cutting element from the work during the arrow 57 retracting stroke. To accomplish the desired rotational movement it is common practice to provide a one-way clutch between the percussion drill housing and the piston. Such a clutch is illustrated generally at 76 in the drawings. The input member in this clutch takes the form of a conventional shaft or rifle bar 78 having splines 79 which slidably interfit with lands or teeth on a nut structure 80 carried by the piston 54. The splines 79 have a slight spiral or helical orientation in the manner of U.S. Pat. 2,737,818. During arrow 57 movement of the piston the clutch 76 prevents any rotation of rifle bar 78; splines 79 of the bar therefore act through nut 80 to exert a rotational stress on the piston. During arrow 59 movement of the piston the one-way clutch 76 allows the rifle bar 78 to rotate freely. Piston 54 thereby has its normal straight line motion unrestrained by the one-way clutch.

Nut 80 is generally similar to the bushing structure of FIG. 1 in that it utilizes a metallic cage 18, plastic bearing elements 32, metallic disks 20, and an end disk or wall 24. The FIG. 14 nut 80 differs from the FIG. 1 nut in that cage 18 is not staked onto wall 24 in the manner of staking 34. The wall 24 and the other disks in the series are installed in the piston 54 so that the disks are semi-rotatable relative to cage 80, at least to a limited extent governed by the frictional forces between adjacent faces of the disks.

At initial installation of the nut, the cage 18 is preferably threaded into the piston until wall 24 abuts against the piston surface 81 with some pressure loading. The direction of threads 30 and the pitch thereof are preferably chosen so that spiral movement of the piston during the arrow 57 stroke causes the nut structure to tighten on the piston. It is believed that this tightening action, though very slight, may improve the bearing action by producing an increase in pressure between the adjacent faces of the various disks for possibly improved heat dissipation and reinforcement of the plastic disks. The structure may to a certain extent be self-tightening for automatic compensation of wear, shrinkage, etc.

As previously mentioned, the piston has fairly high accelerations and velocities during its stroke, for example final velocities near 30 feet per second near the end of the stroke. Also, in certain rock drill operations the cutting element may have a decided tendency to remain lodged in the work. These factors tend to produce comparatively high mechanical forces on the pressure faces of the nut structure 80 and the rifle bar 78. Service life is in part a function of the area of contact between bar 78 and nut 80; the greater the area of contact the less will be the unit area pressure loadings, and the greater will be the service life.

In conventional one piece nut structures different surface areas on the nut bear a fixed relation to one another so that the nut cannot change its shape in order to have extensive area contact at different points along the rifle bar. A conventional one piece nut structure may have rifle bar engagement at three or more spaced points but not simultaneously at all design points. In practice the exact areas of contact are determined by such factors as manufacturing tolerances, wear of the parts, overall design of the drill, and loads on the components, as will be apparent from FIG. 14.

FIG. 15 illustrates in an exaggerated manner the effects of size variations and non-concentricity between the splined bar and nut when the nut is formed as a solid one-piece element. Assume that the rifle bar is somewhat undersize and displaced in a southerly direction, either due to manufacture or wear. Also, assume that during axial movement of the nut the helical pressure faces on the bar tend to rotate the nut in the arrow 90 direction. Pressure faces 92, 94 and 96 of the bar will enjoy pressure contact with the mating faces of the nut, but due to the non-concentricity and undersizing the two remaining pressure faces 98 and 99 will be out of contact with the mating nut faces. As a result there will be undersably high unit area pressure loadings on the contacting faces. Variations in pressure loadings can occur in circumferential and axial directions.

With the multi-disk arrangement of FIG. 14 the helical splines 79 can cause the various individual disks to shift radially to bring themselves into concentricity with the rifle bar. This shifting action should tend to put more nut surface area into pressure contact with the bar faces, and should therefore reduce unit area pressure loadings, thereby prolonging service life.

With the so-called floating disk arrangement of FIG. 14 the rotational thrust forces imposed by bar 78 on the disks will be absorbed by the frictional forces between the disks; the disks will internally act as components of a locked-up clutch, and there will presumably be no radial movements of the disks during most periods of operation. It is believed that disk movement would occur only during the initial break-in period or possibly as an incident to the installation process. The thread 30 direction and pitch automatically provide sufficient clamping force on the disks as will preclude disk displacement during normal service. The bearing acts as a one piece structure, but its component disks can automatically cold flow to conform to the shaft 78 contour in event of uneven pressure loadings.

I claim:

1. In a precussion drill having shaft held against axial movement but free for one-way rotation; a fluid-actuated piston mounted on the shaft for reciprocating movements therealong; said shaft having helical splines which act to turn the piston as said piston moves in one direction, and said piston acting to turn the shaft as the piston moves in the opposite direciton: the improvement comprising a novel bushing carried by the piston for tracking on the helical splines; said bushing comprising a cup-shaped heat-conductive cage threaded into the piston, and multiple annular disks stacked in the stage in keyed relation to the shaft; said disks comprising alternately-arranged plastic disks which form bearing surfaces, and metallic disks which form heat-conductors for dissipating heat developed at the bearing surfaces; said cage being threaded into the piston so that an endmost disk forcibly abuts against a piston surface to apply an axial squeezing force on the trapped disks; the direction of the cage threads being such that when the piston is moving in the aforementioned one direction, the cage tends to thread into the piston to increase the axial squeezing force on the trapped disks.

References Cited

UNITED STATES PATENTS

| | | | |
|---|---|---|---|
| 303,344 | 8/1884 | Uren | 92—31 X |
| 3,508,472 | 4/1970 | Hartwick, Jr. | 92—33 X |
| 1,234,853 | 7/1917 | Bache | 308—239 |
| 2,768,034 | 10/1956 | Skinner | 308—238 |
| 2,989,355 | 6/1961 | Terhorst | 308—238 |

MARTIN P. SCHWADRON, Primary Examiner

B. GROSSMAN, Assistant Examiner

U.S. Cl. X.R.

308—4, 69, 77, 238